United States Patent [19]

Tanikoshi

[11] 3,896,357

[45] July 22, 1975

[54] DRIVING SYSTEM FOR DC MOTORS WITH HALL GENERATORS

[75] Inventor: Kinji Tanikoshi, Tokyo, Japan

[73] Assignees: Canon Kabushiki Kaisha; Canon Seiki Kabushiki Kaisha, both of Tokyo, Japan

[22] Filed: Aug. 23, 1973

[21] Appl. No.: 391,025

[30] Foreign Application Priority Data

Aug. 31, 1972 Japan.............................. 47-87349
Nov. 10, 1972 Japan............................ 47-112626

[52] U.S. Cl................. 318/254; 318/138; 318/439
[51] Int. Cl............................................ H02k 29/00
[58] Field of Search................... 318/254, 138, 439

[56] References Cited
UNITED STATES PATENTS

| | | | |
|---|---|---|---|
| 3,716,769 | 2/1973 | Brunner............................ | 318/254 |
| 3,757,185 | 9/1973 | Brunner et al..................... | 318/254 |
| 3,783,359 | 1/1974 | Malkiel............................. | 318/254 |

*Primary Examiner*—G. R. Simmons
*Attorney, Agent, or Firm*—Fitzpatrick, Cella, Harper & Scinto

[57] ABSTRACT

A brushless DC motor driving system is disclosed. The DC motor has a rotor with magnetic poles of opposite polarities thereon and a stator with at least a pair of flux-producing windings positioned in torque-producing relation with said rotor. Hall generators are provided to sense the magnitude of the rotor flux density as a function of the angular position of the rotor. A resistor for detecting the waveform of the driving current flowing through the stator windings is connected in series to a driving circuit. The signal derived across this resistor is compared with a reference signal representing a voltage at which the overdrive of the driving circuit comprising the semiconductor devices will not occur, and the signal representing the difference therebetween is applied to a control circuit for controlling the voltage to be applied across the Hall generators.

15 Claims, 7 Drawing Figures

DRIVING SYSTEM FOR DC MOTORS WITH HALL GENERATORS

BACKGROUND OF THE INVENTION

1. Field of the Invention

The present invention relates to generally a brushless DC motor driving system and more particularly a driving system for brushless DC motors of the type in which the supply of the driving current to the stator winding is switched in response to the angular position of the rotor made of a permanent magnet, the angular position being detected by Hall generators.

2. Description of the Prior Art

In general the brushless DC motors have been developed in order to eliminate the electrical noise produced by the contact of the brushes with the commutator of the conventional DC commutator motor, so that the brushless DC motor has no brush as its name implies. However when the brushless DC motor is used as a power source for a high frequency equipment such as a communication equipment, the high frequency noise is produced due to the harmonics included in the driving current to be supplied to the torque-producing windings and transmitted through a common power source circuit to the communications equipment so that the operation of the communications equipment is adversely affected. This problem may be overcomed when the driving current with a sinusoidal waveform excluding the harmonic components is supplied to the stator windings. However in the DC motors of the type in which the Hall generators are used to detect the angular position of the rotor, when the output Hall voltage is increased so as to increase the driving current to be supplied to the stator windings, the driving current has a square waveform or pulse-like waveform consisting not only the fundamental component but also harmonic frequency components not included in the input signal so that there arises the problem of harmonic frequency noise. The noise will adversely affect the operation of the communications equipment, data recorders, video recorders and so on.

SUMMARY OF THE INVENTION

One of the objects of the present invention is therefore to provide an improved driving system for DC motors with Hall generators which may substantially eliminate the above and other defects encountered in the conventional brushless DC motor driving systems.

Another object of the present invention is to provide an improved DC motor driving system having a drive control circuit which controls the driving current to be supplied to the stator windings so as to have a sinusoidal waveform.

Another object of the present invention is to provide an improved DC motor driving system of the type in which the voltage of the driving current to be supplied to the stator windings is detected to be compared with a reference signal representing a voltage at which the overdrive of a driving circuit will not occur and the signal representing the difference between these two signals is fed back to an input circuit to the Hall generators so that the output Hall voltage may become less than a voltage at which the overdrive of the drive circuit occurs and the driving current with a sinusoidal waveform may be always supplied to the stator windings.

A further object of the present invention is to provide an improved DC motor driving system of the type in which the output of the Hall generators is applied to a drive circuit comprising a differential amplifier, the output of the drive circuit is applied to a bridge type emitter-follower output stage, and the rotational speed of the DC motor of the type described is detected by a speed control circuit including a tachometer generator so that in response to the output signal of the drive circuit as well as the output signal of the speed control circuit the input to the Hall generators is so controlled as to maintain the speed of the DC motor constant and to supply the driving current with a sinusoidal waveform to the stator windings.

A further object of the present invention is to provide an improved DC motor driving system of the type described above in which a variable resistor is interconnected between the input terminals of the differential amplifier so as to control the speed of the DC motor.

The above and other objects, features and advantages of the present invention will become more apparent from the following description of the preferred embodiments thereof taken in conjunction with the accompanying drawing.

DESCRIPTION OF THE PREFERRED EMBODIMENTS

Figure 1:
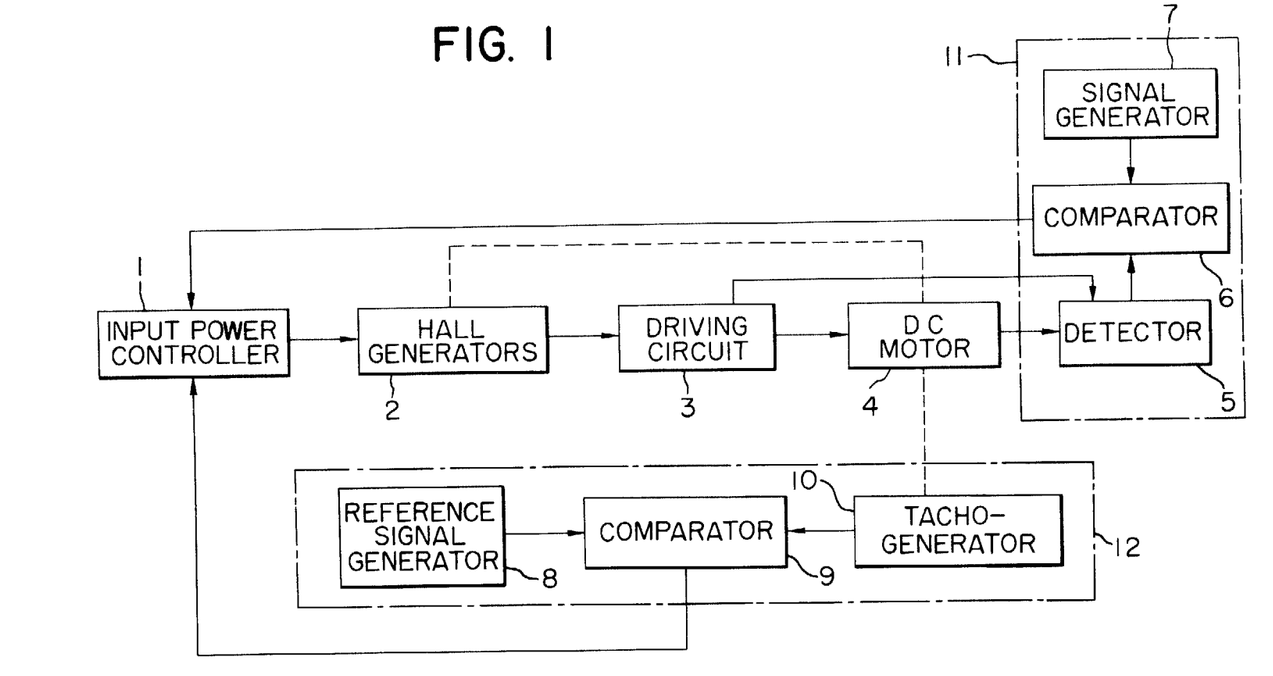
FIG. 1 is a block diagram of a first embodiment of the present invention.

FIG. 1 is a block diagram illustrating the fundamental arrangement of a DC motor in accordance with the present invention. The DC motor 4 includes a rotor with magnetic poles of opposite polarities and a stator having at least a pair of flux-producing windings positioned in torque-producing relation with said rotor. Hall generators 2 are positioned in fixed relation to said stator and angularly spaced apart from each other in magnetic relation to the rotor so as to sense the magnetude of the rotor flux density as a function of the angular position of the rotor. An input power control circuit 1 is connected to Hall generators 2 connected to a driving circuit 3 which in turn is connected to the stator windings of a DC motor 4 and to a detector 5 for detecting the driving current produced by the driving circuit 3. One of the input terminals of a comparator 6 is connected to the outpt terminal of the detector 5 whereas the other input terminal is connected to a signal generator 7 for generating the signal representing the maximum allowable voltage to be applied to the drive circuit 3 without causing the overdrive thereof. The output terminal of the comparator is connected to one of the input terminals of the input power control circuit 1.

The detector 5, the comparator 6 and the signal generator 7 constitute means generally indicated by 11 for maintaining the sinusoidal waveform of the driving current so that the output of the Hall generators 2 may not overdrive the driving circuit 3 comprising semiconductor devices.

A tachometer generator 10 which generates AC or DC voltage proportional to the rotational speed of the DC motor 4 has its output terminal connected to one of the input terminals of a second comparator 9 whose the other input terminal is connected to the output terminal of a reference signal generator 8 which generates a reference signal representing a predetermined constant rotational speed of the DC motor 4. The output terminal of the second comparator 9 is connected to the other input terminal of the input power control circuit 1. The reference signal generator 8, the second comparator 9 and the tachometer generator 10 constitute means generally indicated by 12 for maintaining the rotational speed of the DC motor 4 constant.

Next the mode of operation will be described. In the steady state, the output signal of the tachometer generator 10 representing the instantaneous rotational speed of the DC motor 4 is compared by the second comparator 9 with the reference signal from the reference signal generator 8 so that the output signal representing the difference between the two signals is applied to the input power control circuit 1 so as to control the voltage to be impressed across the Hall generators 2, thereby maintaining the constant rotational speed of the DC motor 4. The output signals of the Hall generators 2 are applied to the driving circuit 3 which supplies in response to the output signals of the Hall generators 2 the driving current with a sinusoidal waveform to the stator windings of the DC motor 4, whereby the DC motor 4 may produce the rotational torque.

When the load of the DC motor 4 and/or the power source voltage vary, the voltage of the driving circuit 3 and the voltages across the stator windings also vary, which is detected by the detector 5. When there is a difference between the control voltage applied from a DC power source (not shown) to the DC motor 4 or to the driving circuit 3 and the reference signal from the signal generator 7, especially when the voltage of the driving circuit 3 is higher than the control voltage, the difference voltage is detected by the comparator 6 so as to control the input power control circuit 1, thereby controlling the voltage less than a predetermined level applied across the Hall generators 2. As a result the output signals of the Hall generators 2 are controlled so that the level of the input signal to the driving circuit 3 may be controlled. The driving current to be supplied to the stator windings is therefore suitably controlled so that the driving current with a sinusoidal waveform may be always supplied to the stator windings. Thus the overdrive and saturation of the driving circuit 3 due to the excess input to the Hall generators 2 which in turn is caused by the variation of the load of the DC motor may be prevented so that the generation of the harmonics may be also prevented.

Figures 2, 3:
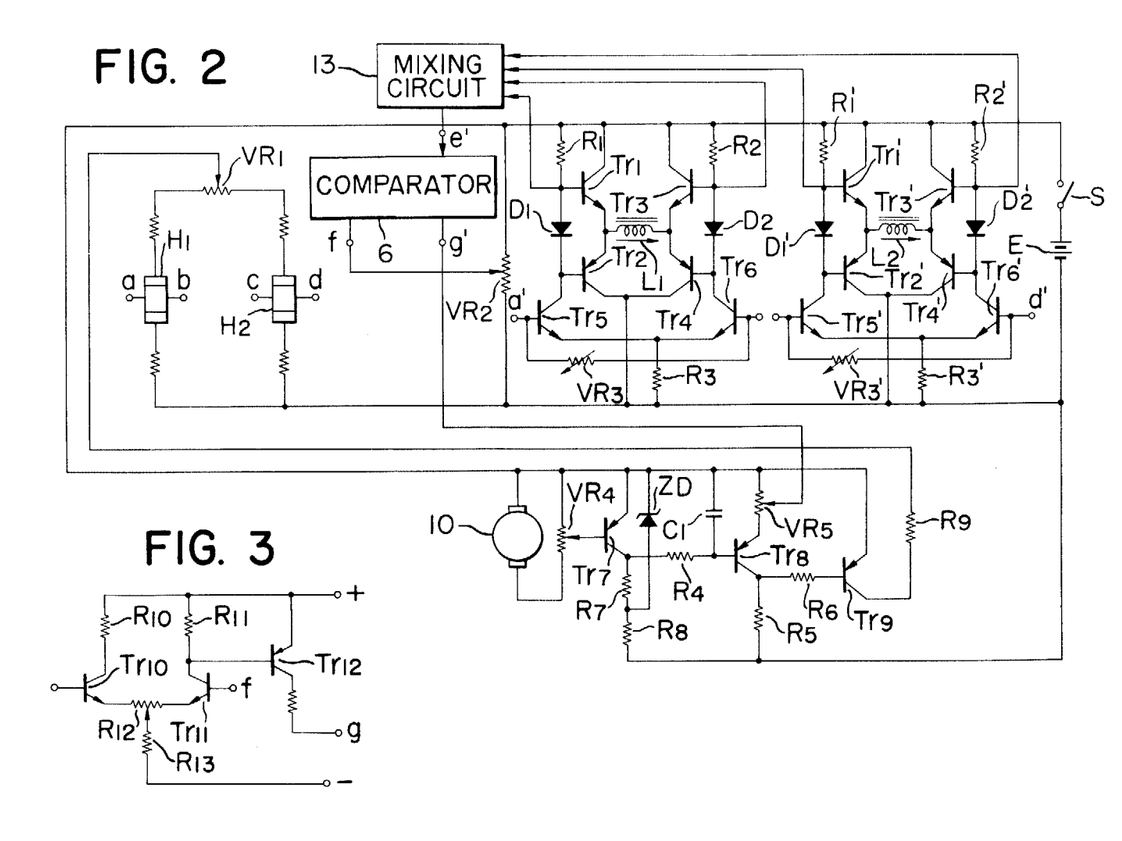
FIG. 2 is a circuit diagram thereof.
FIG. 3 is a circuit diagram of a comparator thereof.

Next referring to FIG. 2 the first embodiment of the present invention will be described in more detail hereinafter. FIG. 2 shows a circuitry for DC motor having Hall generators in accordance, with the present invention. As structurally shown in FIG. 7 in detail, motor 10 includes a rotor R rotable with a shaft sh having magnetic poles of opposite polarity thereon and a stator member having single pair of flux-producing windings $L_1$ and $L_2$ electrically displaced by 90° and positioned in said stator member in torque-producing relation with said rotor. The Hall generators $H_1$, $H_2$ having their ouput terminals, $a$, $b$, $c$, and $d$ are positioned in fixed relation to said stator with an electrical displacement of 90° between the generators, and in a magnetic relation to said rotor to sense the magnetude of the rotor flux density as a function of rotor angular position. The output terminals $a$, $b$, $c$, and $d$ are connected to the input terminals $a'$, $b'$, $c'$ and $d'$, respectively, of the driving circuit which in turn are connected to transistors Tr5, Tr6, Tr5' and Tr6', respectively, of the input stage of the driving circuit. The emitters of the transistors Tr5 and Tr6 are connected through a common emitter resistor R3 to the negative terminal of a power source E whereas the collectors are connected through a switch S to the positive terminal of the power source E through diodes D1 and D2 and resistors R1 and R2, respectively. Transistors Tr1, Tr2, Tr3 and Tr4 form a bridge circuit and their emitters are connected to the stator winding L1. A variable resistor VR3 is interconnected between the base of the transistors Tr5 and Tr6 so as to attain the balance. The drive circuit for the stator winding L2 is similar to the drive circuit for the stator winding L1, and the similar parts are designated by the same reference numerals with primes.

Figures 6, 7:
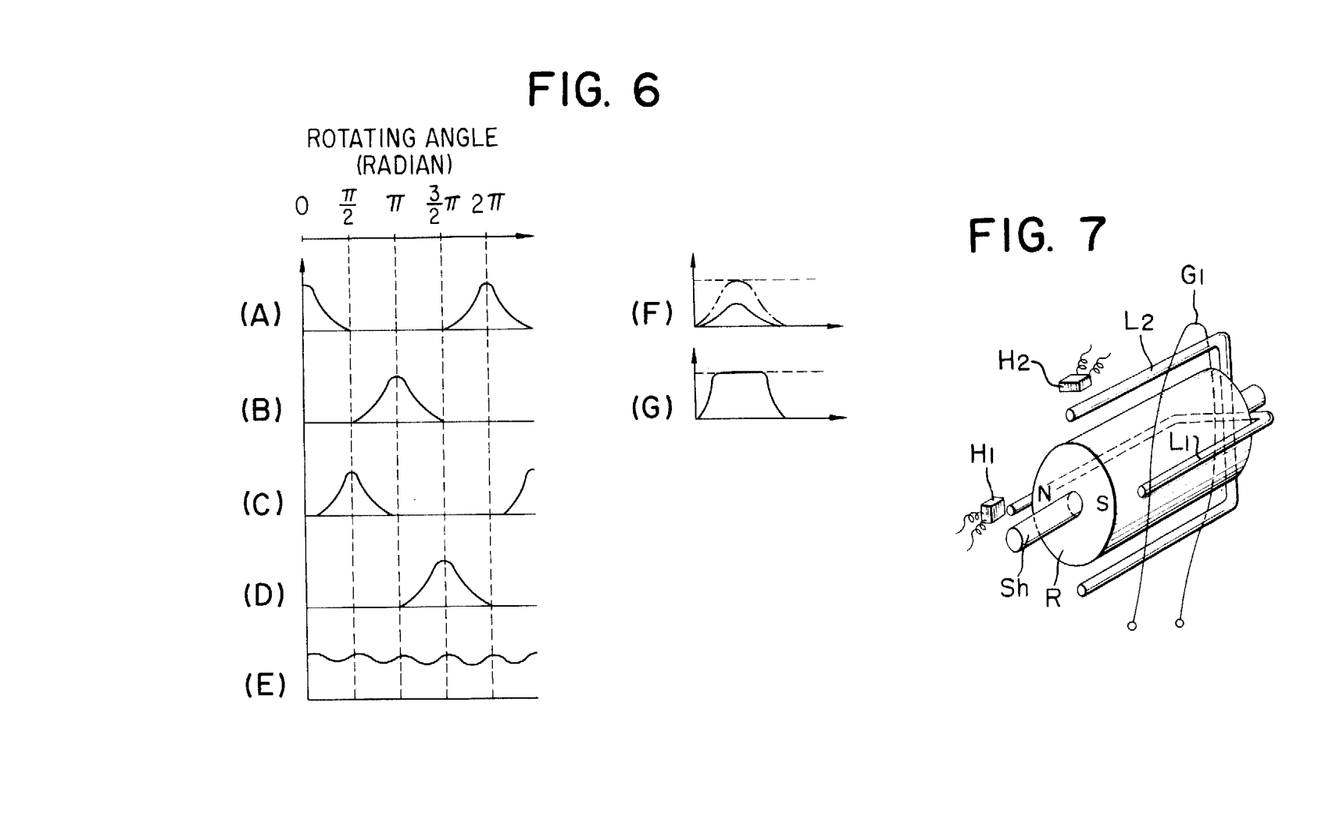
FIG. 6 shows the waveforms used for the explanation of the mode of operation of the first embodiment shown in FIG. 2.
FIG. 7 is a perspective view of a DC motor to which is applied the driving system in accordance with the present invention.

As shown in FIG. 7, the tachometer generator 10 is of AC type having a coil G1 disposed diagonally of the stator windings L1 and L2, and is connected to a transistor Tr7 through a variable resistor VR4 which is used to vary the output of the tachometer generator 10 so that the AC output signal of the tachometer generator 10 may be converted into the pulse signal. The collector of the transistor Tr7 is connected to the base of a mixing Tr8 through a resistor R4, and the collector of the transistor Tr8 is connected through a resistor R6 to the base of a control transistor Tr9. Between the junction of resistors R7 and R8 and the positive terminal of the power source E is interconnected a zener diode ZD for voltage stabilization. A variable resistor VR5 and a resistor R5 are load resistors of the transistor Tr8, and the resistor R4 and a capacitor C1 form a circuit for generating the DC voltage signal representing the frequency of the output signal of the AC tachometer generator 10.

A variable resistor VR1 is inserted in order to attain the balance between the power input circuits of the two Hall generators H1 and H2, and its armature is connected through a resistor R9 to the collector of the transistor Tr9.

A mixing circuit 13 connected to the resistors R1, R2, R1' and R2' detects the voltages across these resistors and the waveforms of the signals applied to the drive circuits. The output signal of the mixing circuit 13 is applied to the comparator 6 to which is also applied the voltage of the power source E divided in such a way that the overdrive of the drive circuits may be prevented. The ouput signal of the comparator 6 is applied through the armature of the variable resistor VR5 to the emitter of the transistor Tr8.

Next referring to FIG. 3 the comparator 6 will be described. The comparator 6 is of the conventional differential amplifier type consisting of amplifying transistors Tr10 and Tr11, an output signal control transistor Tr12 and resistors R10 R15. The terminals $e$, $f$, and $g$ are connected to the terminals $e'$, $f'$ and $g'$ shown in FIG. 2.

Next the mode of operation of the first embodiment shown in FIG. 2 with the above construction will be described with further reference to signal waveforms in FIG. 6. The switching of the supply of the driving current by the Hall generators H1 and H2 is similar to that of the conventional DC motors with Hall generators so that the switching operation will be described in brief hereinafter. The positive Hall voltage (See FIG. 6(A) is induced across the Hall generator H1 which is shown as being in opposed relation with the pole N of the rotor R of the motor in FIG. 7, and then the positive voltage is applied to the input terminal $a'$ of the driving circuit so that the transistor Tr5 is conducted. Due to the voltage drop across the resistor R1 the driving transistors Tr1 and Tr4 are conducted so that the driving current flows through the stator winding L1 in the direction indicated by the arrow in FIG. 2. As a result the rotor of the DC motor rotates in the clockwise direction. When the positive voltage is applied to the input terminal $C'$ as the Hall generator H2 is in opposed relation with the N-pole (See FIG. 6(C)), the transistor Tr5' is conducted so that the transistors Rr1' and Tr4' are conducted. The driving current flows through the stator winding L2 in the direction indicated by the arrow in FIG. 2 so that the rotor R is further rotated in the clockwise direction. When the Hall generator H1 is in opposed relation with the S-pole (See FIG. 6(B)), the positive voltage is applied to the input terminal $b'$ so that the transistor Tr6 is conducted, and then the transistors Tr2 and Tr3 are conducted. As a result the driving current flows through the stator winding L1 in the direction opposite to the arrow in FIG. 2 so that the rotor R continues to rotate in the clockwise direction. When the Hall generataor H2 is in opposed relation with the S-pole (See FIG. 6(D)) the positive voltage is applied to the input terminal $d'$ so that the transistor Tr6 is conducted and then the transistors Tr2' and Tr3' are also conducted. As a result the driving current flows through the stator winding L2 in the direction opposite to that indicated by the arrow so that the rotor R continues to rotate in the clockwise direction. FIG. 6(E) shows the composite waveform of the waveforms shown in FIGS. 6(A), (B), (C) and (D). As described above the drive circuits are switched in responsive to the outputs of the Hall generators and the driving current with a sinusoidal waveform flows through the stator windings L1 and L2 so that the rotor continues to rotate in the clockwise direction.

The tachometer generator 10 generates the voltage representing the rotational speed of the DC motor. The output voltage of the tachometer generator 10 is divided by the variable resistor VR4 and applied to the base of the transistor Tr7. The base-emitter resistance of the transistor Tr7 is so selected as to give the reference signal so that the pulse signal representing the deviation from the reference rotational speed of the DC motor is derived from the collector. The pulse signals are converted by the R4-C1 circuit into the DC voltage signal (analog signal) representing the frequency of the pulses signals. The DC voltage signal is applied to the base of the transistor Tr8 so that the voltage drop across the load resistor R5 is in proportion to the signal for controlling the rotational speed of the motor. In response to the voltage drop across the resistor R5 the conduction of the transistor Tr9 is varied so that the voltage to be applied across the Hall generators H1 and H2 from the power source E may be varied. Therefore the motor may be rotated at a constant rotational speed.

When the driving current flowing through the stator windings L1 and L2 is decreased due to the load variation of the DC motor, the collector potential of the driving transistor Tr1, Tr3, Tr1' or Tr3' is decreased so that the voltage drop across the base resistor R1, R3, R1' or R2' is decreased in proportion, This decrease in voltage drop is applied to the comparator 6 (the input terminal $e'$) through the mixing circuit 13, and the voltage of the power source E divided by a voltage divider VR2 is applied to the comparator 6 through the terminal $f'$. The voltage signal applied to the comparator 6 from the voltage divider VR2 is used to prevent the overdrive of the drive circuit consisting of the bridge-connected transistors, and is compared with the output signal of the mixing circuit 13 representing the input voltage to the driving circuit so that when and only when the output voltage of the mixing circuit 13 is higher than the input voltage applied from the voltage divider VR2, the comparator 6 gives the output signal representing the difference therebetween to the emitter of the transistor Tr8 through the variable resistor. As a result from the transistor Tr8 is derived the composite signal consisting of the signal for rotating the DC motor at a constant speed and the signal for preventing the overdrive of the driving circuit.

In response to the output signal of the transistor Tr8 the transistor Tr9 is driven so that the distortion of the driving current which is caused by the overdrive of the driving circuit by the output signals of the Hall generators may be prevented. That is, the generation of the harmonics due to the saturation of the sinusoidal waveform caused by the overdrive may be prevented. This will be described in more detail with reference to FIGS. 6(F) and 6(G). FIG. 6(F) shows the waveform of the output signals of the driving transistors Tr1–Tr4 and Tr1'–Tr4' when they are operated in the linear region, and the horizontal line indicated by the broken lines shows the upper limit of the linear region whereas the waveform indicated the the chain lines shows the upper limit of the undistorted waveform. FIG. 6(G) shows the waveform of the signal when the transistor is driven into the saturation region, and the waveform indicates pluse with a rectangular waveform. This waveform includes the harmonic components so that the harmonic noise is produced and transmitted to the communications equipment thereby causing a noise.

The last stage of the driving circuit is an emitter-follower so that the transistor Tr1, Tr3, Tr1' or Tr3' is not cut off and operated in the linear region when there is even a small voltage drop across the resistor R1, R2, R1' and R2'. Therefore the adverse effect of noise may be eliminated.

Figure 4:
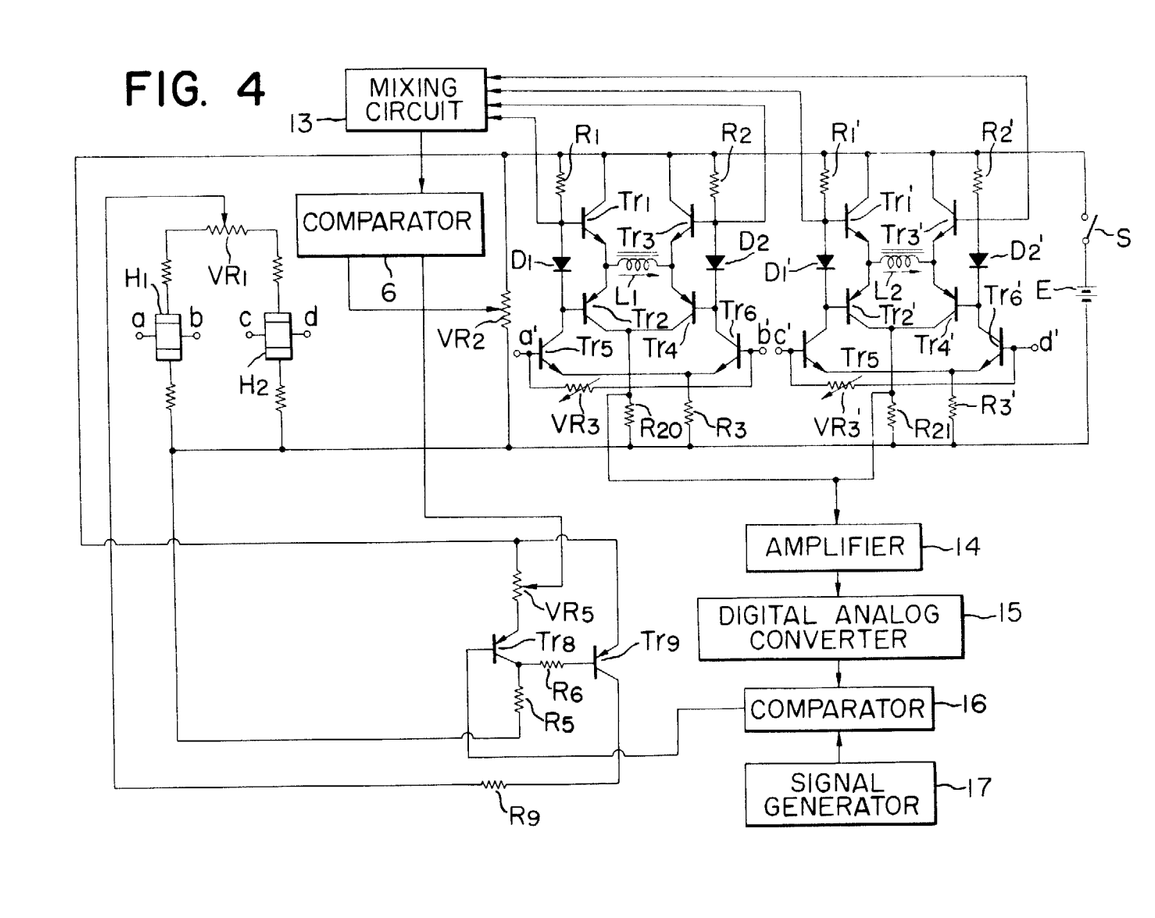
FIG. 4 is a circuit diagram of a variation of the first embodiment shown in FIG. 2.

Next referring to FIG. 4 a variation of the first embodiment will be described. In the variation between the common collector circuits of the transistors Tr2 and Tr4 and Tr2' and Tr4' and the negative terminal of the power source E are interconnected driving current detecting means so that the input to the Hall generators may be controlled in response to the difference signal representing the difference between the reference signal and the output signal from the detecting means, thereby regulating the speed of the DC motor.

Resistors R20 and R21 are interconnected between the above two common collector circuits and the negative terminal of the power source E, and the voltages across these resistors R20 and R21 are detected and amplified by an amplifier 14 connected to a digital-to-analog converted 15 which in turn is connected to one of the input terminals of a comparator 16 to the other input terminal of which is connected the output of a signal generator 17. The output of the comparator 16 is connected to the base of the transistor Tr8 whose collector is connected through the resistor R6 to the base of the transistor Tr9 the collector of which is connected to the input terminal or variable resistor VR1 of the Hall generators H1 and H2 through the resistor R9.

The driving current flowing through the stator windings L1 and L2 also flows through the resistor R20 and R21 so that the sine wave voltage signals are induced across them. The frequency of the sine wave voltage signals is in proportion to the rotational speed of the DC motor so that the voltage induced across the resistor R20 and R21 is amplified by the amplifier 14 and applied to the D-A converter 15 where the sine wave voltage signal is converted into the DC or analog signal whose level is in proportion to the frequency of the sine wave voltage signal. The DC signal from the D-A converter 15 is compared with the reference signal from the reference signal generator 17 by the comparator 16 and the output signal representing the difference therebetween is applied to the base of the transistor from the comparator 16 when the rotational speed of the DC motor is faster than a predetermined speed which is represented by the reference signal. As described with reference to FIG. 2 to the emitter of the transistor Tr8 are applied the driving signal with a sinusoidal waveform and the voltage of the power source E divided by the variable resistor VR5. When the base potential is increased the degree of conduction of the transistor Tr8 is decreased so that the collector potential is increased. As a result the degree of conduction of the transistor Tr9 is also decreased so that the voltage to be applied across the Hall generators H1 and H2 is decreased in proportion. Therefore the Hall voltages are reduced so that the driving current to be supplied to the stator windings L1 and L2 is also decreased. Consequently the rotational speed of the rotor of the DC motor is decreased to a predetermined constant speed.

On the other hand when the rotational speed of the DC motor is slower than a predetermined speed, no output signal is derived from the comparator 16 so that the degrees of conduction of both transistors Tr8 and Tr9 are large. As a consequence a high voltage is applied across the Hall generators H1 and H2 so that the rotational speed of the DC motor may be restored to a predetermined speed.

Instead of the analog comparator 16, a digital comparator may be of course used so that the D-A converter 15 may be eliminated but a digital reference signal generator must be used instead of the analog reference signal generator 17.

Figure 5:
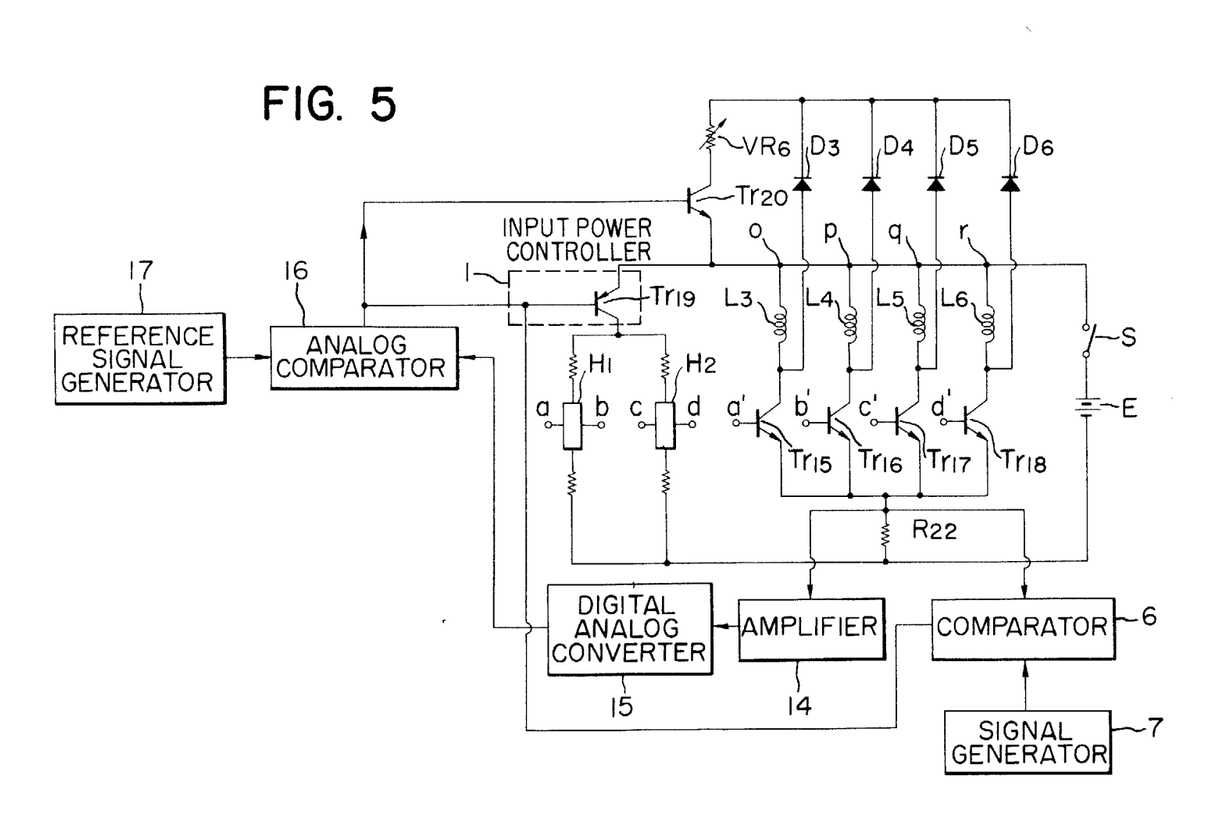
FIG. 5 is a circuit diagram of a second embodiment of the present invention.

In the second embodiment to be described hereinafter with reference to FIG. 5, four stator windings L3, L4, L5 and L6 are used. The bases $a'$, $b'$, $c'$ and $d'$ of transistors Tr15, Tr16, Tr17, and Tr18 are connected to the output terminals $a$, $b$, $c$ and $d$, respectively, of the Hall generators H1 and H2, and the stator windings L3–L6 are interconnected between the collectors of the transistors Tr15–Tr18 and the positive terminal of the power source E through the on-off switch S. The emitters of the transistors Tr15–Tr18 are connected through a common emitter resistor R22 to the negative terminal of the power source E. Between the collectors of the transistors Tr15–Tr18 and the positive terminal of the power source E are interconnected in series diodes D3–D6 for detecting the voltages induced across the stator windings L3–L6, respectively, a variable resistor VR6 and a transistor Tr20, which constitute a brake circuit for applying brake to the DC motor to bring the rotational speed of the DC motor to a predetermined speed when the rotational speed is higher than a predetermined speed.

The resistor R22 is connected to the comparator 6 (See FIG. 2) and to the amplifer 14 (See FIG. 4) so as to detect the voltage across the resistor R22. To the comparator 6 is connected the reference signal generator 7 for generating a reference signal representing a voltage at which the drive circuits are not overdriven, and the output of the comparator 6 is connected to the input power control circuit 1 for controlling the voltage to be applied across the Hall generator H1 and H2.

The amplifier 14 is connected to the analog comparator 16 through the digital-to-analog converter 15, and the reference signal generator 17 for generating a reference signal representing a predetermined speed of the DC motor is also connected to the comparator 16. The output of the comparator 16 is connected to the input power control circuit 1 and to the base of the transistor Tr20 in the brake circuit. Only the last stage transistor Tr19 of the input power control circuit 1 is shown in FIG. 5 for simplicity.

Like the first embodiment, the waveform of the driving current or voltage applied to the stator windings L3–L6 spaced apart angularly by 90° from each other is detected through the resistor R22. If the detected signal will causes the overdrive of the derive circuit, the output signal of the comparator 6 is applied to the input power control circuit 1. The output signal of the comparator 16 representing the deviation from a predetermined speed is also applied to the control circuit 1. When the level of the composite signal of these two output signals is higher, the degree of conduction of the transistor Tr19 is decreased so that the voltage to be applied across the Hall generators H1 and H2 is decreased in proportion. As a result the driving current with a sinusoidal waveform is supplied to the stator windings so that the DC motor may rotate at a predetermined constant speed.

Next the mode of operation of the brake circuit will be described. When the rotational speed of the DC motor is in excess of a predetermined speed, the output signal of the comparator 16 is applied to the base of the transistor Tr20 so that the latter is conducted to actuate the brake circuit. The voltage induced across the stator winding which is not supplied with the driving current makes the collector potential of the transistor Tr15, Tr16, Tr17 or Tr18 higher than the potential at the junction $o$, $p$, $q$ and $r$ so that the braking current is made of flow through the de-energized stator winding in the direction opposite to that of the driving current, thereby producing the braking or retarding force in the direction opposite to that of the rotation of the rotor. The braking or retarding force may be adjusted by the variable resistor VR6.

When the rotational speed becomes excessively higher, The brake circuit is immediately actuated to brake the DC motor to a predetermined rotational speed.

As described hereinbefore, according to the present invention the driving current with a sinusoidal waveform is always supplied to the stator windings of the DC motor so that the noise problem due to the generation of the harmonics may be eliminated. Furthermore the variation in torque-produced by the DC motor may be minimized.

The resistors are used for directly detecting the driving current supplied to the stator windings, thereby detecting the instantaneous speed of the DC motor as well as the waveform of the driving current so that the temperature dependence may be completely eliminated as compared with the conventional system in which the rotational speed of the DC motor is detected in terms of the voltages induced across the stator windings. The DC motor in accordance with the present invention can be therefore operated in a very reliable manner over a wide temperature range.

Since the frequency of the sinusoidal waveform signal detected through the resistor in a digital manner is converted into the analog signal, the speed control may be effected with an extremely higher degree of accuracy.

I claim:

1. A DC motor and driving control system therefor comprising, in combination;
   a. a rotor having magnetic poles of opposite polarities thereon;
   b. a stator having flux-producing windings positioned in torque-producing relation to said rotor;
   c. Hall generators positioned in flux-sensing relationship to said magnetic poles and actuatable to detect the instantaneous rotational speed of said rotor and to generate electrical signals with a frequency responding to the rotational speed of said DC motor;
   d. driving means having transistors for applying an exciting current to said windings in response to the output signals from said Hall generators;
   e. detecting means connected with said transistors in said driving means to detect a saturated state of said transistors;
   f. signal generating means for generating a signal corresponding to a predetermined voltage lower than a saturation voltage of said transistors in said driving means so as not to saturate said transistors;
   g. comparator means for comparing the output signal of said detecting means with the output signal of said generating means so as to generate a signal representing the difference therebetween; and
   h. means for controlling the voltage to be applied to said Hall generators in response to the output signal of said comparator means, thereby controlling the level of the output signals of said Hall generators.

2. A DC motor and driving control system therefor as defined in claim 1 wherein
   said detecting means comprises a resistor connected in series to the base electrode of the transistor in said driving means.

3. A DC motor and driving control system therefor as defined in claim 1 wherein
   said comparator means comprises a differential amplifier.

4. A DC motor and driving control system therefor as defined in claim 1 wherein
   said means for controlling the voltage to be applied across said Hall generators comprises
   means for dividing the voltage of said power source so as to obtain a suitable voltage to be applied across said Hall generators.

5. A DC motor and driving control system therefor as defined in claim 1 wherein
   said flux-producing windings comprises one pair of windings having an effective torque-producing portion extended in an axial direction of rotation of said rotor and respective windings being arranged in a spaced relation of substantially 90°.

6. A DC motor and driving control system therefor as defined in claim 1 wherein
   said driving means has a plurality of an emitter-follower transistor circuits the number of which is equal to that of said stator windings.

7. A DC motor and driving control system therefor comprising, in combination;
   a. a rotor having a magnetic poles of opposite polarities thereon;
   b. a stator having flux-producing windings positioned in torque-producing relation to said rotor;
   c. Hall generators positioned in flux-sensing relationship to said magnetic poles and actuatable to detect the instantaneous rotational speed of said rotor and to generate electrical signals with a frequency responding to the rotational speed of said DC motor;
   d. driving means having transistors for applying an exciting current to said windings in response to the output signals from said Hall generators;
   e. detecting means connected with said transistors in said driving means to detect a saturated state of said transistors;
   f. signal generating means for generating a signal corresponding to a predetermined voltage lower than the saturation voltage of said transistors in said driving means so as not to saturate said transistors;
   g. first comparator means for comparing the output signal from said detecting means with the output signal from said generating means so as to generate a signal representing the difference therebetween;
   h. means for controlling the voltage to be applied to said Hall generators in response to the output signal of said comparator means, thereby regulating the level of the output signals of said Hall generators;
   i. means for detecting the rotational speed of said DC motor so as to generate a signal representing the rotational speed;
   j. means for generating a reference signal corresponding to a predetermined reference speed of said DC motor to rotate said DC motor at the predetermined speed;
   k. second comparator means for comparing the output signal of said DC motor speed detecting means with the output signal of said reference signal generating means so as to generate a signal representing the difference therebetween which is applied to said means for controlling the voltage to be applied across said Hall generators, whereby said Hall generators generate the Hall voltage at which said DC motor may be rotated at a predetermined speed and that said driving means may generate the driving current with a sinusoidal waveform.

8. A DC motor and driving control system therefor as defined in claim 7 wherein said DC motor speed detecting means comprises a tachometer generator for detecting the rotational speed of the rotor of said DC motor.

9. A DC motor and driving control system therefor as defined in claim 7 wherein
said waveform detecting means comprises a resistor connected in series to said driving means.

10. A DC motor and driving control system therefor comprising, in combination;
   a. a DC motor;
   b. means for generating electrical signals with frequency representing the instantaneous rotational speed of said DC motor;
   c. driving means having transistors for applying an energizing potential to said motor in response to the signals from said generating means;
   d. detecting means connected with said transistors in said driving means to detect a saturated state of said transistors;
   e. means for generating a signal corresponding to a predetermined voltage lower than the saturation voltage of said transistors in said driving means to as not to saturate said transistors;
   f. comparator means for comparing the output signal from said detecting means with the output signal of said generating means so as to generate a signal representing the difference therebetween; and
   g. means for controlling the voltage to be applied to said electrical signal generating means (b) in response to the output signal of said comparator means;
   h. means for detecting the rotational speed of said DC motor so as to generate a signal representing the same;
   i. reference signal generating means for generating a reference signal representing a predetermined speed of said DC motor;
   j. second comparator means for comparing the output signal from said DC motor detecting means with the output signal of said second reference signal generating means so as to generate a signal representing the difference therebetween,
   said second comparator means being connected to said control means (g),
   said control means being capable of receiving the output signals of said first and second comparator means so as to detect the composite signal thereof,
   in response to said composite signal the magnitude of electrical power with which said electrical signal generating means is actuated being controlled and said unidirectional power source and said electrical signal generating means being operatively connected so that the rotation of said DC motor at a predetermined speed may be accomplished under the optimum operation range of said driving means.

11. A DC motor and driving control system therefor as defined in claim 10 wherein
said DC motor speed detecting means comprises
   a. a resistor connected in series to said driving means for detecting energizing potential, and
   b. means for detecting the voltage across said resistor in a digital manner and converting the voltage across said resistor into the analog DC signal.

12. A DC motor and driving control system therefor as defined in claim 10 wherein
said reference signal generating means comprises means for generating an analog reference signal.

13. A DC motor and driving control system therefor as defined in claim 10 wherein
said first and/or second comparator means comprises an analog comparator capable of receiving an analog signal.

14. A DC motor and control system therefor comprising, in combination;
   a. a rotor having magnetic poles of opposite polarities thereon;
   b. a stator having flux-producing windings positioned in torque-producing relation to said rotor;
   c. Hall generators positioned in flux-sensing relationship to said magnetic poles so as to detect the rotational speed of said rotor and to generate electrical signals with a frequency responding to the rotational speed of said rotor;
   d. driving means having transistors for applying an exciting current to said windings in response to the output signals from said Hall generators;
   e. first means for controlling the exciting current applied from said driving means to that it always has a sinusoidal waveform;
   said first control means having
   detecting means connected with said transistors in said driving means to detect a saturated state of said transistors;
   signal generating means for generating a signal corresponding to a predetermined voltage lower than a saturation voltage of said transistors in said driving means so as not to saturate said transistors; and
   comparator means for comparing the output signal of said detecting means with the reference signal from said reference signal generating means;
   f. second control means for maintaining the speed of said DC motor at a predetermined speed;
   said second control means having
   means for detecting the instantaneous speed of said DC motor;
   second reference signal generating means for generating a reference signal representing a predetermined speed of said DC motor; and
   second comparator means for comparing the output signal of said instantaneous speed detecting means with the reference signal from said second reference signal generating means;
   g. third control means for controlling the voltage applied across said Hall generators in response to the output signals from said first and second control means;
   h. brake means connected to said stator windings and to said third control means and adapted to be actuated in response to the output signal of said third control means to as to pass the braking current through said stator windings utilizing the voltages induced across them. whereby when the speed of said DC motor is in exess of a predetermined speed it is rapidly returned to a predetermined speed by said brake means.

15. A DC motor and driving control system therefor comprising, in combination;
   a. a DC motor;
   b. means for generating electrical signals with a frequency corresponding to the instant rotational speed of said DC motor;

c. driving means having transistors for applying an energizing potential to said motor in response to the signals from said generating means;
d. detecting means connected with said transistors in said driving means to detect a saturated state of said transistors;
e. signal generating means for generating a signal corresponding to a predetermined voltage lower than a saturation voltage of said transistors in said driving means so as to saturate said transistors;
f. comparator means for comparing the output signal from said detecting means with the reference signal from said reference signal generating means so as to generate a signal representing the difference therebetween;
g. control means for controlling the voltage applied to said electrical signal generating means (b) in response to the output signal of said comparator means;

whereby said signal generating means (b) always generates an output signal of sinusoidal waveform so as to operate said transistors in said driving means in the linear region.

* * * * *

UNITED STATES PATENT OFFICE
CERTIFICATE OF CORRECTION

Patent No. 3,896,357　　　　　　　　　Dated　July 22, 1975

Inventor(s)　KINJI TANIKOSHI

It is certified that error appears in the above-identified patent and that said Letters Patent are hereby corrected as shown below:

Column 1, line 9, "winding" should read --windings--;

Column 1, line 27, "overcomed" should read --overcome--;

Column 1, line 36, "the" should read --of the--;

Column 2, lines 52 and 53, "magnetude" should read --magnitude--;

Column 2, line 60, "outpt" should read --output--;

Column 3, line 11, "the other" should read --other--;

Column 4, line 8, "magnetude" should read --magnitude--;

Column 4, line 23, "base" should read --bases--;

Column 4, line 36, "mixing" should read --mixing transistor--;

Column 5, line 36, "generataor" should read --generator--;

Column 5, line 46, "responsive" should read --response--;

Column 6, line 44, "the the" should read --the--;

Column 6, line 48, "pluse" should read --a pulse--;

Column 7, line 6, "converted" should read --converter--;

Column 7, line 8, "of which" should read --to which--;

Column 8, line 10, "brake" should read --a brake--(second occurrence);

Column 8, line 22, "generator" should read --generators--;

UNITED STATES PATENT OFFICE
CERTIFICATE OF CORRECTION

Patent No. 3,896,357      Dated July 22, 1975

Inventor(s) KINJI TANIKOSHI      Page - 2

It is certified that error appears in the above-identified patent and that said Letters Patent are hereby corrected as shown below:

Column 8, line 37, "will causes" should read --causes--;

Column 8, line 37, "derive" should read --drive--;

Column 8, line 59, "and" should read --or--;

Column 8, line 60, "of flow" should read --to flow--;

Column 8, line 67, "The" should read --the--;

Column 10, Claim 6, line 15, "an emitter-" should read --emitter- --;

Column 10, Claim 7, line 20, "a magnetic" should read --magnetic--;

Column 11, Claim 10, line 11, "frequency" should read --a frequency--;

Column 11, Claim 10, lines 22 and 23, "to as not to saturate" should be --so as not to saturate--;

Column 13, Claim 15, line 10, "so as to" should read --so as not to--.

Signed and Sealed this twenty-eight Day of October 1975

[SEAL]

Attest:

RUTH C. MASON
*Attesting Officer*

C. MARSHALL DANN
*Commissioner of Patents and Trademarks*